May 17, 1938.  R. W. JOHNSON ET AL  2,117,726
VALVE
Filed March 7, 1936
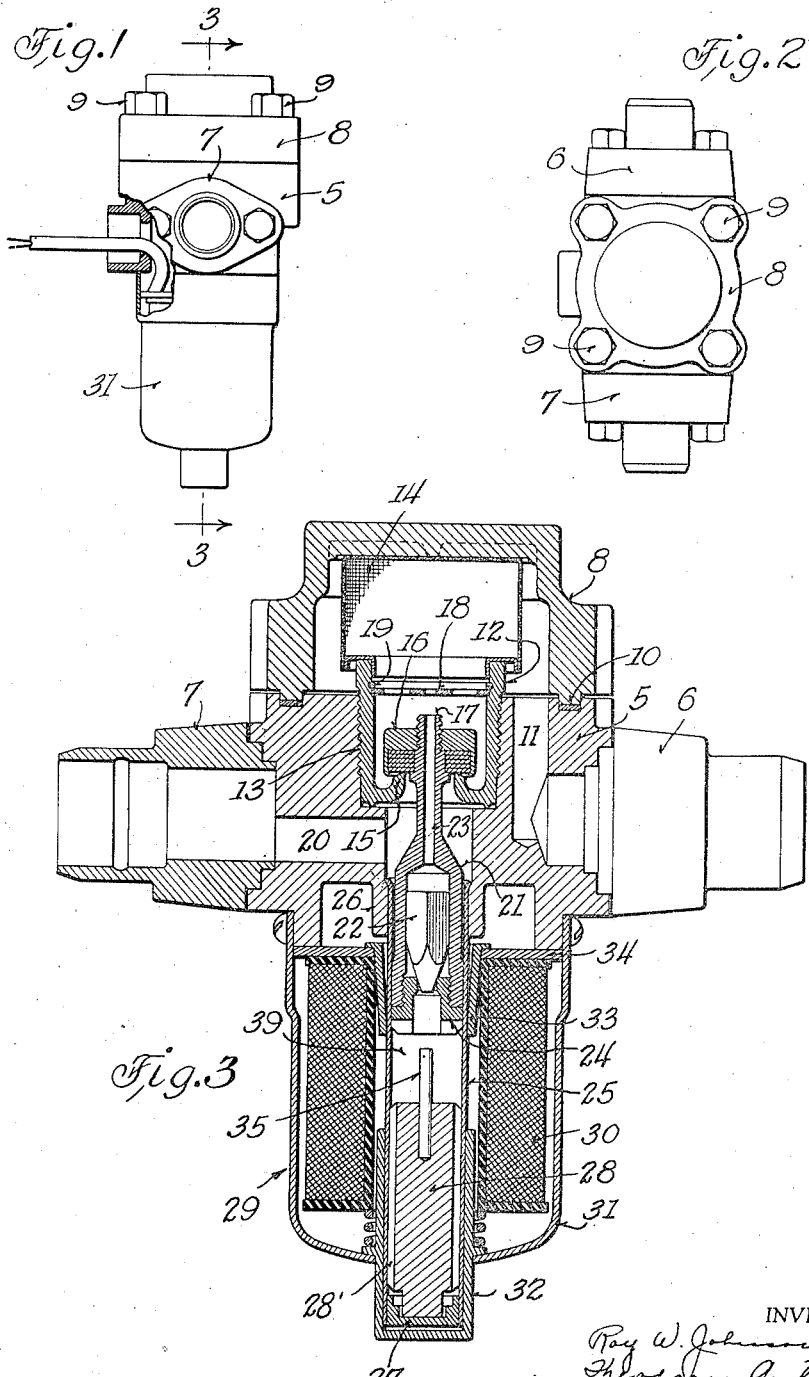

Patented May 17, 1938

2,117,726

UNITED STATES PATENT OFFICE 2,117,726

VALVE

Roy W. Johnson and Theodore A. Wetzel, Milwaukee, Wis., assignors to Automatic Products Company, Milwaukee, Wis., a corporation of Wisconsin Application March 7, 1936, Serial No. 67,621

8 Claims. (Cl. 137—139)

This invention relates to an improvement in valves and although adapted for a number of uses and applications may be employed to special advantage as a refrigerant liquid line control.

One of the objects of the present invention is to provide a valve of this character which is effective and reliable when used to control liquid under high pressures and yet requires a low current input for the magnetic winding of the valve. Furthermore, there is a low pressure drop through the valve.

Another object is to provide a valve of this character and having these advantages and which is simple and compact in its construction, and so conveniently organized that the various parts are readily accessible for purposes of replacement or repair.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a view in side elevation showing a valve providing the present invention;

Figure 2 is a view thereof in top plan; and

Figure 3 is a view in transverse vertical cross section taken on line 3—3 of Figure 2.

Referring to the drawing, it will be seen that the valve comprises generally a valve body or casing 5 provided with an inlet fitting 6 and an outlet fitting 7. A cap or bonnet 8 is provided for the valve body and is releasably secured in position by screws 9. A gasket 10 may be provided between the interfitting surfaces of the body 5 and its cap or bonnet 8. The opening through the inlet fitting 6 communicates with a passage 11 leading up through the valve body and into the interior of the cap 8. A sleeve 12 is threadedly interconnected with a central opening 13 provided in the valve body. The sleeve 12 carries a strainer 14 which is contained within the chamber within the cap or bonnet 8. The lower end of the sleeve 12 is provided with an internal flange or ported partition providing a valve seat 15.

A main valve 16 operates in the sleeve 12 and is threadedly connected to the upper portion of a valve stem 17. The stem 17 projects upwardly beyond the valve 16 and when the valve is open engages a perforated stop plate 18 held in position in the interior of the sleeve 13 by a resilient expanding ring retainer 19. The port or central opening of the valve seat 15 accommodates the portion of the valve stem which extends downwardly therethrough and this port of the valve seat communicates with an outlet passage 20. Below the passage 20 the stem of the valve is enlarged as indicated at 21 and is hollowed internally to provide a chamber for a pilot valve 22. Above the pilot valve 22 the valve stem 17 has an axial opening or bore 23. The pilot valve 22 is biased by its own weight to engage a valve seat 24 threaded into the lower end of the enlarged portion 21 of the valve stem. It will be noted that the valve seat 24 is flanged and together with the adjacent portion of the valve stem 21 provides a piston which works in a cylinder or sleeve 25. The sleeve 25 has its upper end interfitted with and suitably secured and hermetically sealed to the valve body as indicated at 26 and its lower end is hermetically sealed by a closure plug 27 to which it is suitably secured.

This cylinder 25 also contains the armature 28 of an electro-magnet designated generally at 29 and having a suitable winding 30 encircling the sleeve 25 and protected by a casing or housing 31 which forms part of the magnetic circuit. The casing 31 is iron or other metal of appropriate magnetic properties whereas the sleeve 25 is of non-magnetic material such as brass. In connection with the magnetic action it will be noted that a flux sleeve 32 is provided which is constructed of magnetic material such as steel.

At the opposite end of the electro-magnetic winding a flux bushing 33 and flux washer 34 are provided. The arrangement is such as to provide a complete magnetic circuit which effectively threads the armature.

A valve operating pin 35 is fixed to and projects beyond the upper end of the armature 28.

In operation, when the winding 30 is energized the armature 28 is pulled upwardly with a quick motion and its pin 35 strikes the lower end of the pilot valve 22 thereby unseating this valve. The armature 28 has longitudinal slots 28' in its periphery to facilitate its motion and action. Pressure then flows from the inlet 6, through the passage 11, through the screen 14, down through the sleeve 13 and through the longitudinal opening 23 of the valve stem into the pilot valve receiving chamber and thence around the pilot valve and out past its seat. The spaces between the flats on the peripheral surface of the pilot valve 22 and the internal wall of its chamber provide for the free flow of the fluid. The pressure then builds up in the chamber 39 below the piston structure provided at the lower end of the main valve stem. The area which this piston structure presents to this fluid pressure is greater than that presented to the fluid pressure at the main valve seat and this combined with the electrical energy exerted through the armature 28 quickly unseats the main valve 16. The parts remain in this position as long as the winding 30 is energized. When the winding 30 is de-energized the pilot valve 22 closes by gravity. The plunger 28 drops by gravity and this allows the pilot valve 22 to seat. The fit of the piston structure provided at the lower end of the main valve stem in its cylinder 25 is suitable to allow the pressures on the opposite end portions of the main valve to equalize when the pilot valve 22 is closed and this occurs in a rather short interval. As soon as the main valve 16 approaches its seat the pressure acting on the upper surfaces thereof quickly close it.

By removing the cap or bonnet 8 the sleeve 13 may be readily detached and all of the operating parts of the valve are then easily removed. Because of the fact that the armature of the magnet has imposed upon it only the duty of unseating the small pilot valve 22, but small current input is required for the electro-magnet.

While we have shown and described one construction in which the invention may be advantageously embodied, it is to be understood that this construction has been selected merely for the purpose of illustration or example and that various changes in the size, shape and arrangement of the parts may be made without departing from the spirit of the invention or the scope of the subjoined claims.

The invention claimed is.

1. A device of the character described comprising a casing having an inlet and an outlet and also having a passageway therebetween, a valve seat in said passageway, a main valve disposed on the inlet side of said seat and seating downwardly thereagainst, a main valve stem extending downwardly from said main valve and having a passage extending therethrough from one side of the main valve to the other, said passage being enlarged below said main valve seat to provide a pilot valve chamber; a member connected to the lower end of said stem and providing a valve seat and also coacting with the lower portion of the stem to provide a piston, a pilot valve in said chamber and seating downwardly against said last-named valve seat, a cylinder in which said piston is operatively fitted, said cylinder having its upper end communicating with the outlet side of the main valve and being otherwise closed, an armature in said cylinder below the piston and having means for opening the pilot valve when the armature is raised and an electromagnetic winding surrounding the cylinder and effective when energized to raise the armature to cause opening of the pilot valve and of the main valve.

2. A device of the character described comprising a casing having an inlet and an outlet and also having a passageway therebetween, a valve seat in said passageway, a main valve disposed on the inlet side of said seat and seating downwardly thereagainst, a main valve stem extending downwardly from the main valve and formed to provide a pilot valve chamber and a piston, there being a passage through the stem from one side of the main valve to the other, a pilot valve in said chamber for controlling flow through said passage, a cylinder in which said piston is operatively fitted, said cylinder having its upper end secured to said casing and communicating with the outlet thereof, said cylinder being otherwise closed, an armature in said cylinder below the piston and having means for opening the pilot valve when the armature is raised, and an electromagnetic winding surrounding the cylinder and effective when energized to raise the armature to cause opening of the pilot valve and of the main valve.

3. A device of the character described comprising a casing having an inlet and an outlet and also having a passageway therebetween, a valve seat in said passageway, a main valve disposed on the inlet side of the said seat and seating downwardly thereagainst, a main valve stem extending downwardly from the main valve and formed to provide a pilot valve chamber and a piston, there being a passage through the stem from one side of the main valve to the other, a pilot valve in said chamber for controlling flow through said passage, a cylinder in which said piston is operatively fitted, an armature in the cylinder below the piston and having means for opening the pilot valve when the armature is raised, said cylinder being of non-magnetic material, a flux sleeve arrangement disposed on the exterior of the cylinder and an electromagnetic winding surrounding the cylinder and effective, when energized, in conjunction with said flux sleeve arrangement, to cause a magnetic circuit to thread the armature and raise it to cause opening of the pilot valve and the main valve.

4. A device of the character described comprising a casing having an inlet and an outlet and also having a passageway therebetween, a sleeve threadedly connected with said passageway and provided with a valve seat, a main valve disposed on the inlet side of said seat and seating downwardly thereagainst, a main valve stem extending downwardly from the main valve and formed to provide a pilot valve chamber and a piston, there being a valve seat in the pilot valve chamber, a pilot valve biased to seat downwardly against the seat in said pilot valve chamber, there being a passageway through the stem from one side of the main valve to the other, a cylinder having its upper end open and secured to the valve casing, said cylinder being otherwise closed, said piston being operatively fitted in said cylinder, and a removable cap for the casing overlying said sleeve, whereby when the cap is removed the sleeve may be unthreaded and the sleeve, main valve, its stem, pilot valve and piston removed as a unit.

5. A device of the character described comprising a casing having an inlet and an outlet and also having a passageway therebetween, a valve seat in said passageway, a main valve disposed on the inlet side of said seat and seating downwardly thereagainst, a main valve stem extending downwardly from said main valve and having a passage extending therethrough from one side of the main valve to the other, said passage being enlarged below said main valve seat to provide a pilot valve chamber, means at the lower end of the main valve stem providing a piston, there being an upwardly facing seat in said pilot valve chamber, a pilot valve in said chamber and seating downwardly against said last-named valve seat, a cylinder in which said piston is operatively fitted, said cylinder having its upper end communicating with the outlet side of the main valve and being otherwise closed, an armature in said cylinder below the piston and having means for opening the pilot valve when the armature is raised and an electromagnetic winding surrounding the cylinder and effective when energized to raise the armature to cause opening of the pilot valve and of the main valve.

6. A device of the character described comprising a casing having an inlet and an outlet and also having a passageway therebetween, a valve seat in said passageway, a main valve disposed on the inlet side of said seat and seating downwardly thereagainst, a main valve stem extending downwardly from said main valve and having a passage therethrough from one side of the main valve to the other, said passage being enlarged below said main valve seat to provide a pilot valve chamber, there being a valve seat at the lower end of the pilot valve chamber, a pilot valve in said chamber and seating downwardly against said last-named seat, the lower portion of the valve stem being constituted to provide a piston structure, and a cylinder in which said piston is operatively fitted.

7. A device of the character described comprising a casing having an inlet and an outlet and also having a passageway, a main valve disposed on the inlet side of said seat and seating downwardly thereagainst, a main valve stem extending downwardly from said main valve and having a passage therethrough from one side of the main valve to the other, said passage being enlarged below said main valve seat to provide a pilot valve chamber, a flanged nut connected with the lower end of the main valve stem to provide a valve seat and also to coact with the main valve stem to provide a piston structure, a pilot valve in said chamber and seating downwardly against said last-named valve seat, and a cylinder in which said piston structure is operatively fitted.

8. A valve comprising a casing having an inlet and an outlet and provided with a passageway extending to the outlet, a sleeve threadedly connected with said passageway and provided with a valve seat, a main valve cooperating with said valve seat and having a stem provided with a pilot valve and a piston, a perforated stop plate secured to the sleeve and cooperable with the main valve to limit the opening movement thereof, a cylinder coacting with the piston, electromagnetic means for opening the pilot valve, and a removable cap, cooperating with the casing to complete the enclosure of the sleeve, said casing also having a passageway extending from the inlet to the interior of the cap.

ROY W. JOHNSON.
THEODORE A. WETZEL.